(12) United States Patent
Wurster et al.

(10) Patent No.: US 8,743,439 B2
(45) Date of Patent: Jun. 3, 2014

(54) METHOD FOR GENERATING AN OPTIMIZED PRINTER CALIBRATION

(75) Inventors: Jürgen Wurster, Dettenhausen (DE); Henning Kramer, Tübingen (DE)

(73) Assignee: GMG GmbH & Co. KG, Tübingen (DE)

( * ) Notice: Subject to any disclaimer, the term of this patent is extended or adjusted under 35 U.S.C. 154(b) by 80 days.

(21) Appl. No.: 13/502,750

(22) PCT Filed: Oct. 19, 2010

(86) PCT No.: PCT/EP2010/006380
§ 371 (c)(1),
(2), (4) Date: Jul. 1, 2012

(87) PCT Pub. No.: WO2011/047831
PCT Pub. Date: Apr. 28, 2011

(65) Prior Publication Data
US 2012/0257227 A1  Oct. 11, 2012

(30) Foreign Application Priority Data
Oct. 19, 2009 (DE) .......................... 10 2009 049 960

(51) Int. Cl.
*H04N 1/46* (2006.01)
*H04N 1/60* (2006.01)
*G06K 9/00* (2006.01)
*G01D 18/00* (2006.01)

(52) U.S. Cl.
USPC ............ 358/525; 358/1.9; 358/504; 382/165; 382/167; 702/86

(58) Field of Classification Search
USPC .......... 358/1.9, 504, 518, 520, 523, 525, 539; 382/162, 163, 165, 167
See application file for complete search history.

(56) References Cited

U.S. PATENT DOCUMENTS

| | | | | |
|---|---|---|---|---|
| 5,285,297 A | * | 2/1994 | Rose et al. ..................... | 358/518 |
| 5,553,199 A | * | 9/1996 | Spaulding et al. ............. | 358/1.9 |
| 6,222,648 B1 | * | 4/2001 | Wolf et al. ..................... | 358/504 |
| 6,441,923 B1 | * | 8/2002 | Balasubramanian et al. ............................ | 358/3.23 |
| 6,575,095 B1 | * | 6/2003 | Mahy et al. ................... | 101/485 |

(Continued)

FOREIGN PATENT DOCUMENTS

EP   1237355 A2   9/2002
EP   1398956 A1   3/2004

OTHER PUBLICATIONS

EFI: Printer Linearization; Retrieved from the Internet URL:http://w3.efi.com/services/proofing-services/~/media/Files/EFI/COM/Services/Printer-linearization_070813.pdf: Aug. 13, 2007; pp. 3-7.

*Primary Examiner* — Madelein A Nguyen
(74) *Attorney, Agent, or Firm* — Gudrun E. Huckett

(57) ABSTRACT

In order to optimize the calibration tables of a printer, and to improve the calibration for combined printing with respect to one-dimensional calibration, a method for optimized printer calibration is proposed, comprising the following method steps: a) for each primary color, the maximal value is colorimetrically limited; b) each primary color is colorimetrically linearized; c) the maximal value of the combined printing of all primary colors is determined colorimetrically; d) a definition of the resulting color range is made; e) the outer layer of the color range is determined at equal spaces; and f) the intermediate values of the resulting calibration tables are interpolated.

14 Claims, 12 Drawing Sheets

(56) References Cited

U.S. PATENT DOCUMENTS

| | | | |
|---|---|---|---|
| 6,724,500 B1 * | 4/2004 | Hains et al. | 358/1.9 |
| 6,833,937 B1 * | 12/2004 | Cholewo | 358/518 |
| 6,956,672 B1 * | 10/2005 | Huang et al. | 358/1.9 |
| 7,190,487 B2 * | 3/2007 | Dalrymple et al. | 358/1.9 |
| 7,251,058 B2 * | 7/2007 | Pop | 358/1.9 |
| 7,382,490 B2 * | 6/2008 | Lammens et al. | 358/1.9 |
| 7,383,261 B2 * | 6/2008 | Mestha et al. | 1/1 |
| 7,411,696 B2 * | 8/2008 | Maltz | 358/1.9 |
| 7,724,392 B2 * | 5/2010 | Kuhn et al. | 358/1.9 |
| 7,889,403 B2 * | 2/2011 | Kuhn et al. | 358/504 |
| 8,064,112 B1 * | 11/2011 | Bernasconi | 358/515 |
| 8,120,812 B2 * | 2/2012 | Sharma et al. | 358/1.9 |
| 8,203,749 B2 * | 6/2012 | Vilar et al. | 358/1.9 |
| 8,223,399 B1 * | 7/2012 | Lee et al. | 358/1.9 |
| 8,395,831 B2 * | 3/2013 | Qiao | 358/518 |
| 8,422,103 B2 * | 4/2013 | Qiao et al. | 358/523 |
| 8,547,609 B2 * | 10/2013 | Qiao | 358/518 |
| 2002/0122208 A1 | 9/2002 | Siegeritz | |
| 2003/0050768 A1 * | 3/2003 | Mestha et al. | 702/196 |
| 2003/0055611 A1 * | 3/2003 | Mestha et al. | 702/196 |
| 2003/0090689 A1 * | 5/2003 | Klassen | 358/1.9 |
| 2003/0098986 A1 * | 5/2003 | Pop | 358/1.9 |
| 2004/0109180 A1 * | 6/2004 | Braun et al. | 358/1.9 |
| 2005/0071104 A1 * | 3/2005 | Viturro et al. | 702/85 |
| 2005/0073545 A1 * | 4/2005 | Vilanova et al. | 347/19 |
| 2005/0243339 A1 * | 11/2005 | Kuhn et al. | 358/1.9 |
| 2006/0176526 A1 * | 8/2006 | Iannazzi | 358/504 |
| 2007/0103707 A1 * | 5/2007 | Klassen | 358/1.9 |
| 2008/0137150 A1 * | 6/2008 | Wang et al. | 358/406 |
| 2010/0157397 A1 * | 6/2010 | Qiao | 358/518 |
| 2010/0228511 A1 * | 9/2010 | Chin et al. | 702/82 |
| 2012/0133960 A1 * | 5/2012 | Henderson | 358/1.9 |
| 2012/0133961 A1 * | 5/2012 | Henderson | 358/1.9 |
| 2012/0147391 A1 * | 6/2012 | Bala et al. | 358/1.9 |

* cited by examiner

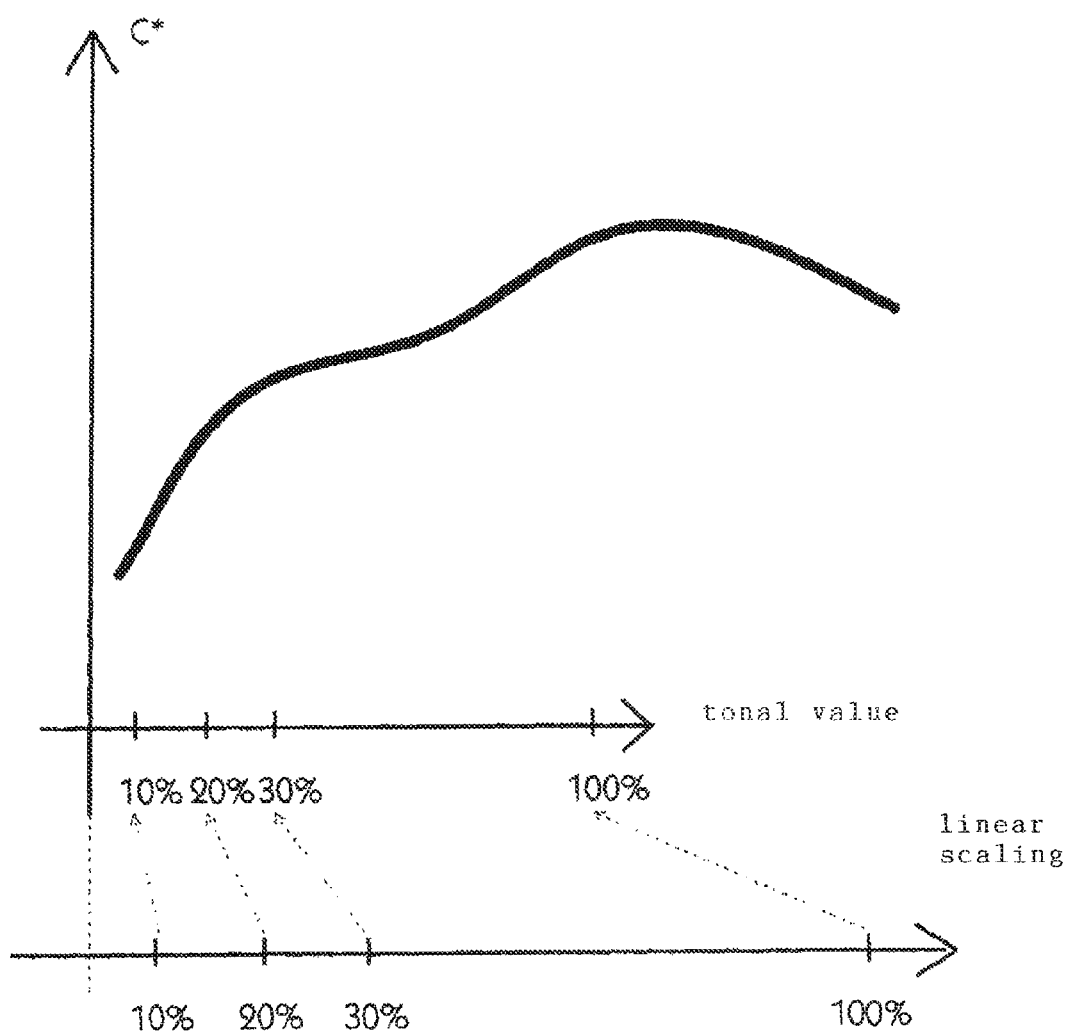

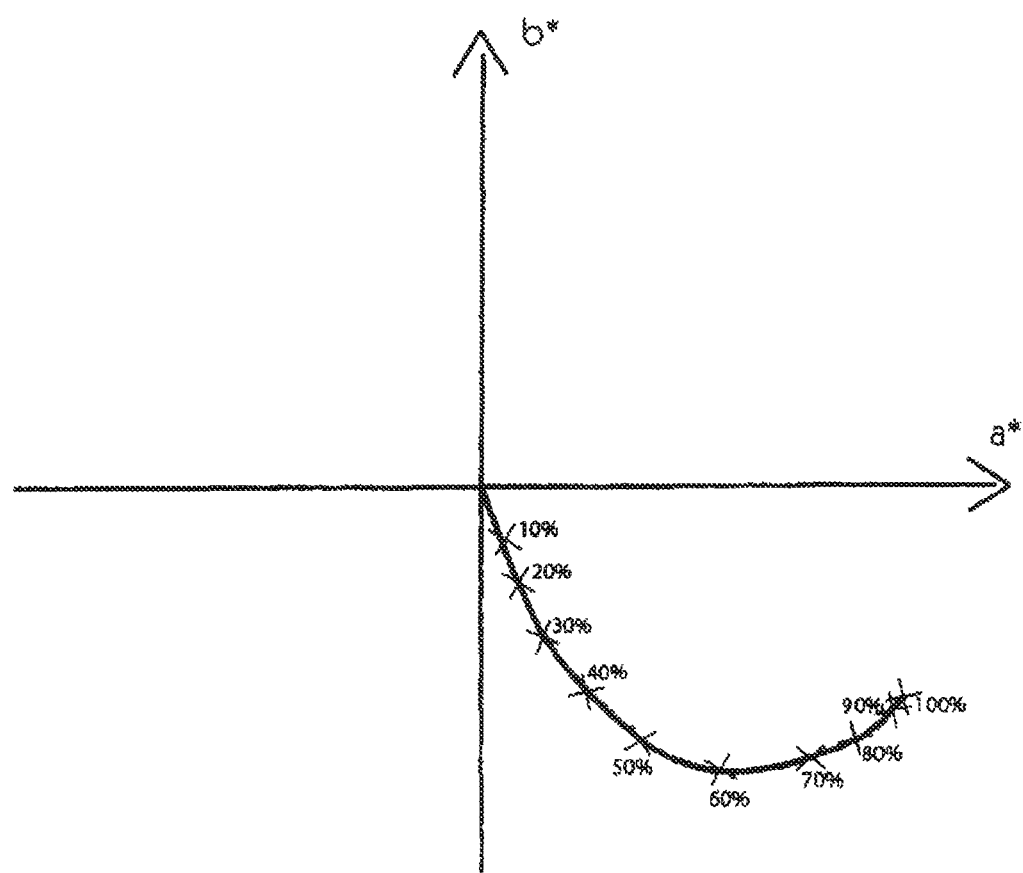

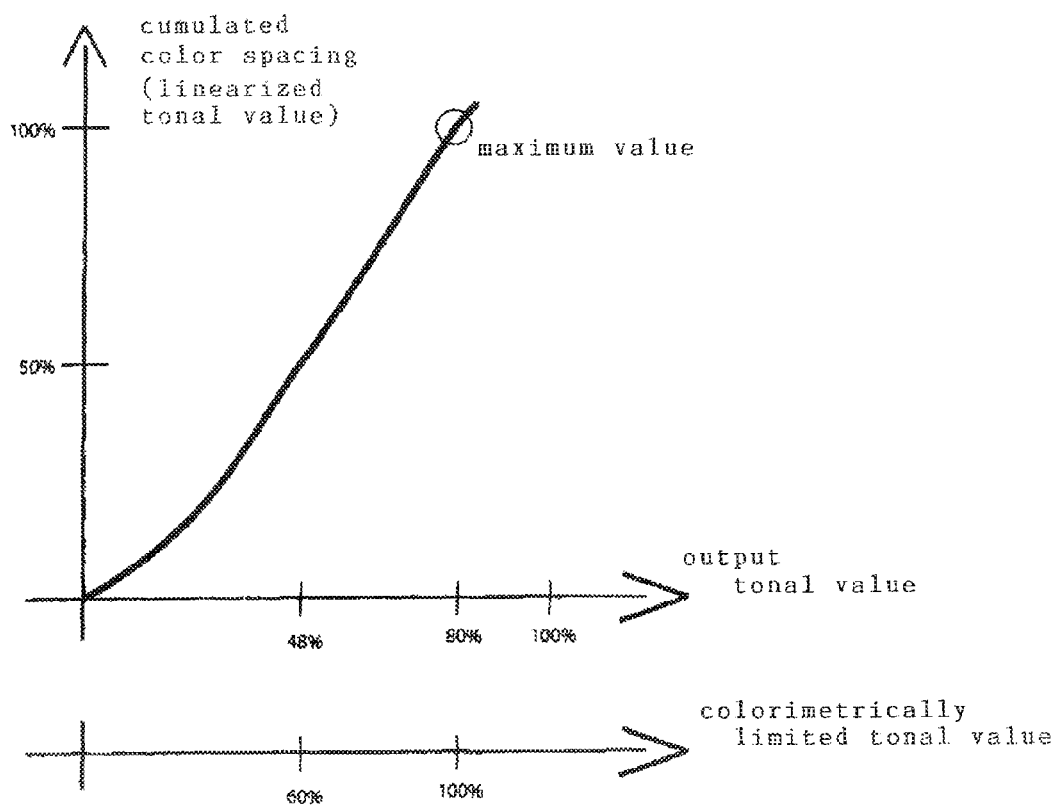

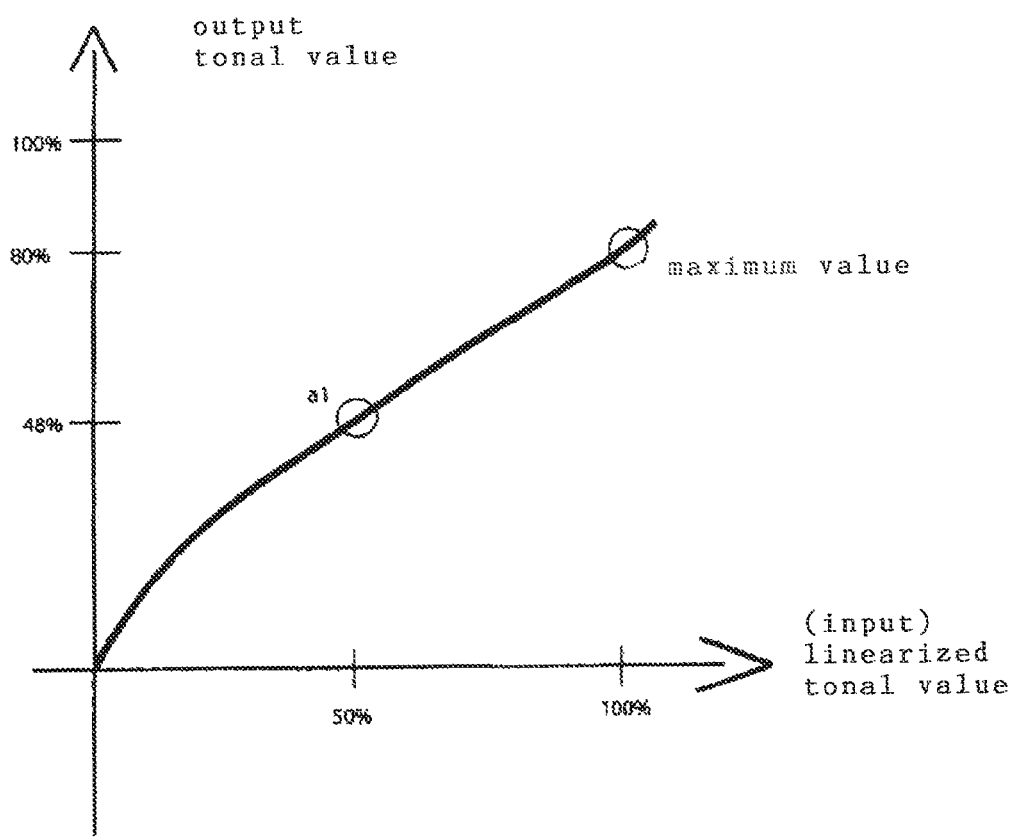

Fig. 2d

| input tonal value | colori- metrically limited value | output tonal value |
|---|---|---|
| 0% | 0% | 0% |
| 50% | 60% | 48% |
| 100% | 100% | 80% |

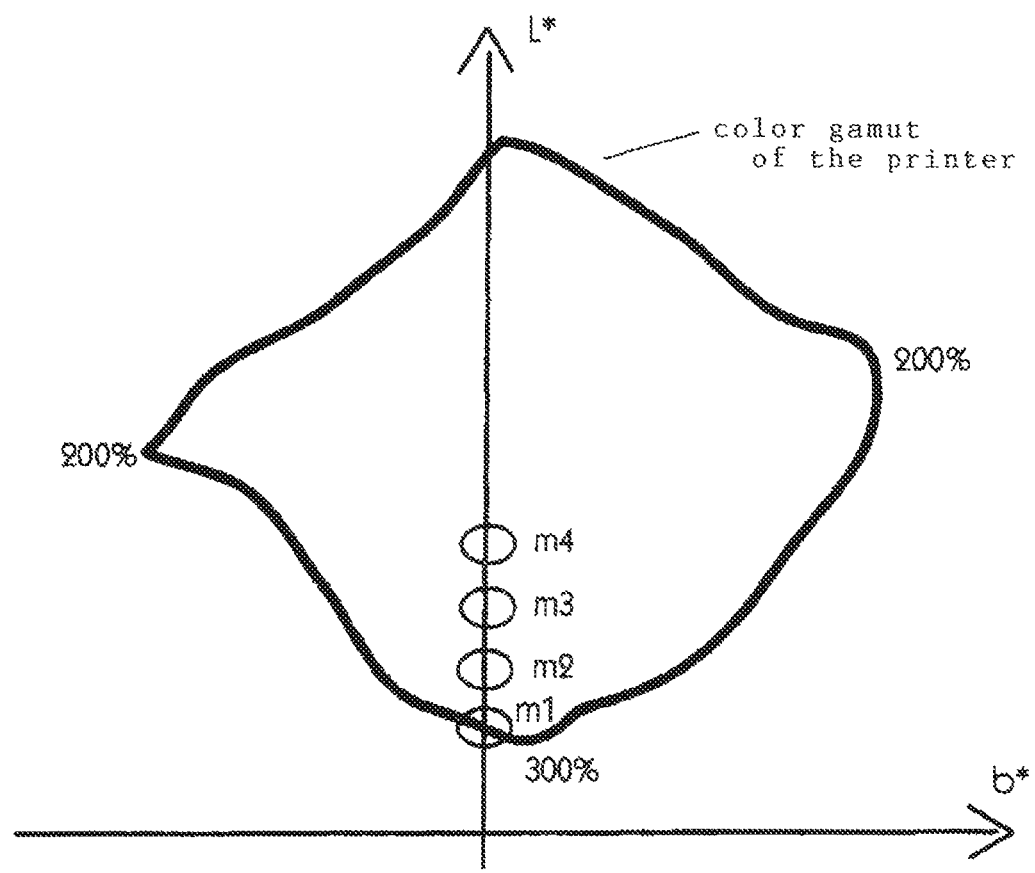

METHOD FOR GENERATING AN OPTIMIZED PRINTER CALIBRATION

BACKGROUND OF THE INVENTION

The present invention concerns a method for generating an optimized printer calibration.

In general, printers (inkjet systems, laser systems, other digital printer systems) are linearized or calibrated by means of a density-based linearization of the primary colors. These printers operate generally with the primary colors cyan, magenta, yellow, and black (CMYK). Calibration in this context is to be understood as restoring a defined nominal state. For the example of density calibration, this is restoration of the nominal densities. For the linearization, the maximum color density for each color is determined and then, linearly descending, the corresponding density value for intermediate steps. Subsequently, the percental control values (tonal values) at which the defined color densities can be achieved are searched for. This correlation is saved for each print color in a one-dimensional table. In case of a calibration, this search is repeated again in order to reach the defined densities again; however, in this case the changed behavior of the printer is taken into account. Instead of measured densities, measured color values (e.g. CIELAB values) can also be employed for linearization and calibration. Example: For 100% cyan a maximum density of 1.5 is measured. In order to achieve half of the density, i.e., 0.75, only 43% of cyan must be printed. In the linearization or calibration table, the output value 43% is thus correlated with the input value 50%.

In this method, it is not taken into account that the behavior of combined printing of the printer may change even though the primary colors have reached their nominal state again after calibration. Despite calibration, a visible difference results therefore in combined printing. An improvement of calibration is achieved in that a three-dimensional or higher dimensional correlation table is formed that contains also nominal values for colors that result from combined printing. Upon calibration, a combination of the primary colors that reproduces the defined nominal color is then searched for. As nominal values, measured color values are employed in this case that correspond to the visual perception of the human eye (CIELAB). In this case, for a combination of the input tonal values, a nominal CIELAB value and the combination of the primary colors required for reaching the nominal value are saved in the calibration table.

Based on this, as a further important aspect, a defined and constant description of the printable color gamut of the printer is provided that can be used for further tasks, for example, for the calculation of simulation profiles. In this connection, a different color reproduction method is simulated on the printer.

In the known method, the nominal values are measured. This does not imperatively achieve that the values have the same spacing. Also, no neutral gray balance is provided. On the other hand, the measured nominal values are subject to the usual fluctuations occurring for any measurement.

The terminology that is employed in the present context is based on the following brief descriptions:

Colors, referred to in colorimetrics more precisely as color stimulus specification, are based on color stimuli that differ with respect to their spectral composition. Because of the necessity to be able to precisely define these differences, various color models have been developed. Each color can be defined by a color name (descriptive words) but also by the numerical color point. Depending on the color model the color can be described with respect to brightness, saturation, and hue but also in accordance with light/dark, red/green, and yellow/blue value (as, for example, in the frequently employed CIELAB color model) with three such parameters in a distinct way.

In the CIELAB color model, the three parameters $L^*$, $a^*$, and $b^*$ define a three-dimensional Cartesian space that is referred to as color space. A color point characterizes in this context a point within this CIELAB color space that is identified by its three coordinates. The spacing between two color points corresponds in approximation to the visually perceived color difference between the realization of these colors. Color spaces serve thus inter alia for visualizing differences between an ideal state, for example, the desired nominal values, and the achieved reality.

The color-generating method can realize only a portion of all conceivable color points. Some colors have a defined color point but cannot be represented with the available color means. The representable colors form within the color space a body that is also referred to as gamut. This gamut is referred to as color gamut.

SUMMARY OF THE INVENTION

Based on the afore described prior art, it is the object of the invention to eliminate the disadvantages of a one-dimensional calibration for combined printing and to optimize at the same time the calibration tables.

As a technical solution the invention proposes a method with the following partial steps:
1. Colorimetric limitation of the maximum value of the primary colors
2. Colorimetric linearization of the primary colors
3. Colorimetric determination of the maximum value of combined printing of all colors
4. Determination of the equal-spaced outer envelope of the color gamut
5. Interpolation of all intermediate values of the calibration tables
6. Saving and applying the calibration tables.

The method according to the invention serves for generating an optimized calibration table and defining the nominal values for this table. Optimal maximum values for the primary colors are defined and then linearized. Furthermore, a three-dimensional or higher dimensional correlation table is generated that takes into consideration an optimal maximum color application of all print colors. In this connection, a color space that is visually as equally spaced as possible is defined that contains a neutral gray axis and provides homogenous color transitions.

BRIEF DESCRIPTION OF THE DRAWINGS

FIG. 1c shows removal of the values above the optimal maximum value and linear scaling of the tonal values.

FIG. 2a shows the curved graph of a primary color in the CIE $L^*a^*b^*$ color space.

FIG. 2b shows the course of cumulated color spacing relative to the tonal values.

FIG. 2c shows the inverted function that assigns the tonal values to the cumulated color spacing where a1 corresponds to half the total cumulated color spacing.

FIG. 2d shows the linearization table for a primary color.

FIG. 3a shows a section of the CIE L*a*b* color space and the darkest point on the neutral axis m1, wherein points m2, m3, and m4 are lighter in each case by a defined amount.

DESCRIPTION OF PREFERRED EMBODIMENTS

Figure 1A:
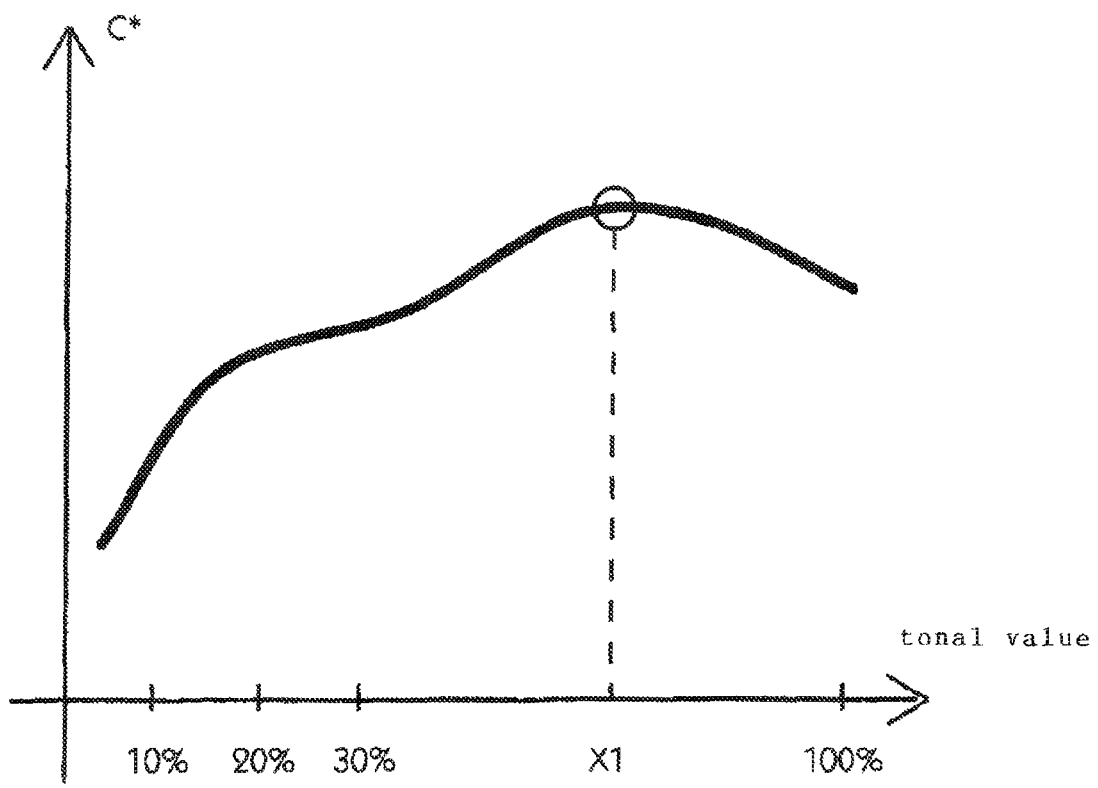
FIG. 1a shows the course of saturation of a primary color and the determination of the optimal maximum value based on the maximum of saturation, wherein saturation is plotted across the percental tonal value in the x-direction and x1 represents the optimal maximum value.
Figure 1B:
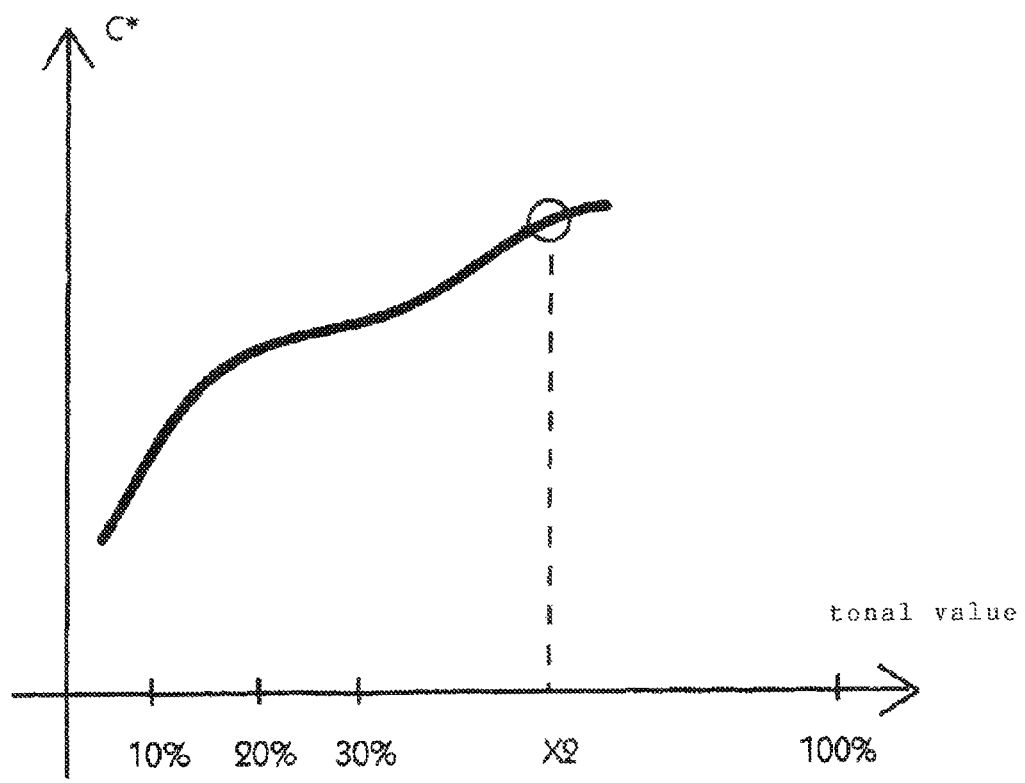
FIG. 1b shows the determination of the optimal maximum value based on the drop of the increase of saturation below a defined value.
Figure 3B:
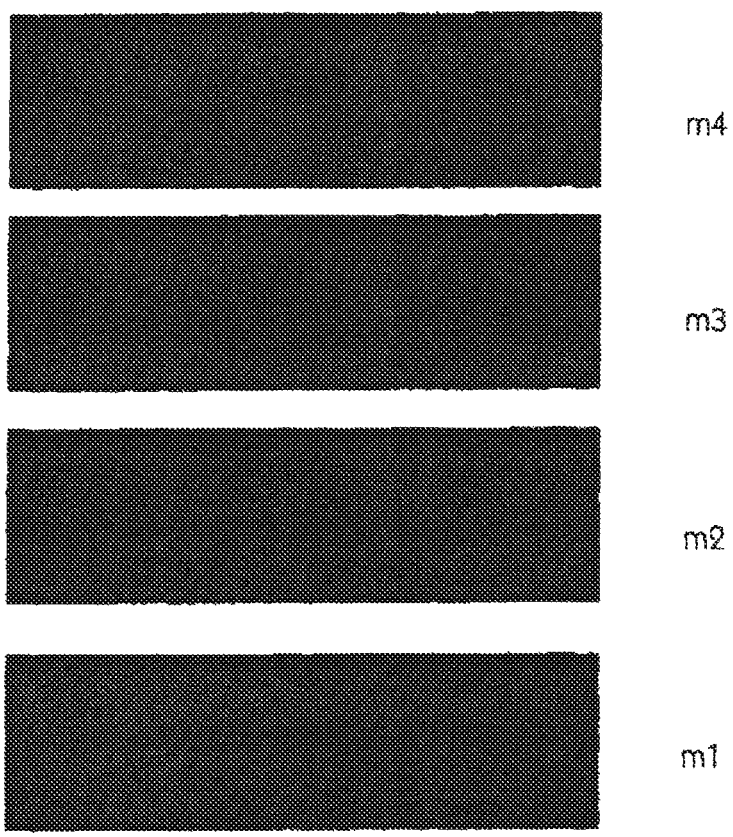
FIG. 3b shows schematically the test chart to be printed.
Figure 3C:
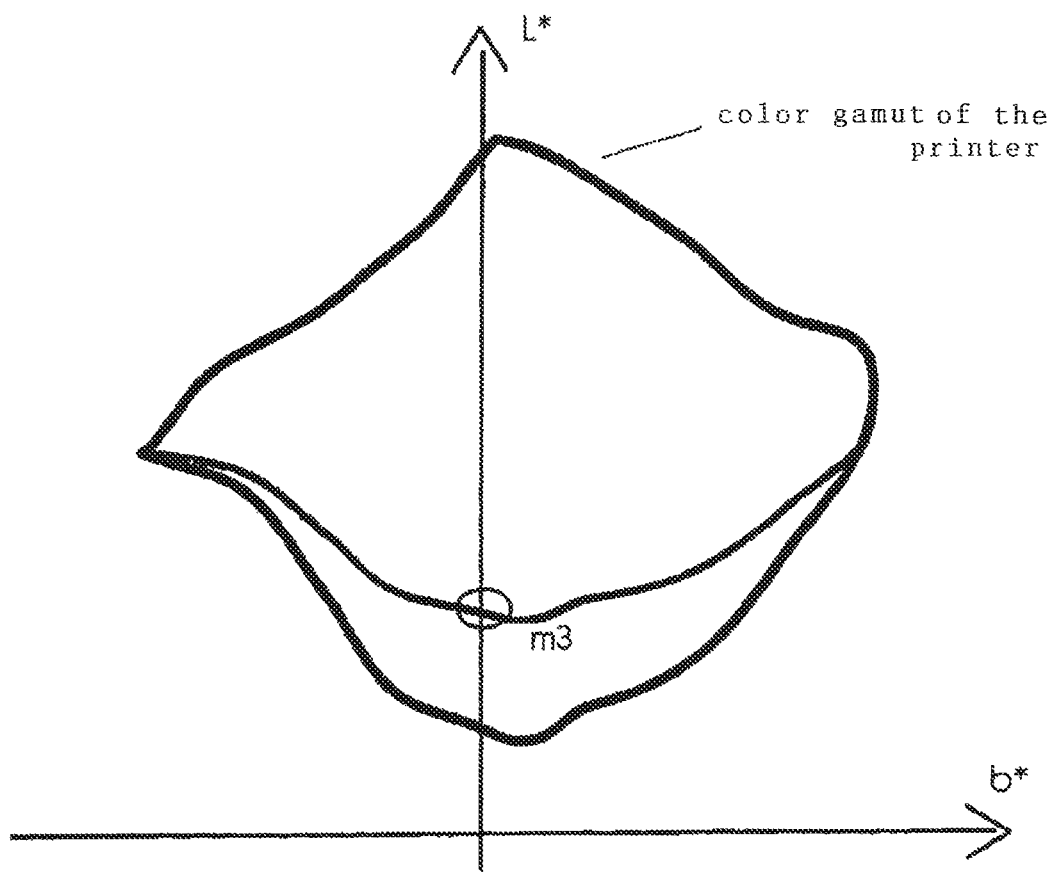
FIG. 3c shows the color space that has been scaled based on the maximum value m3.
Figure 4A:
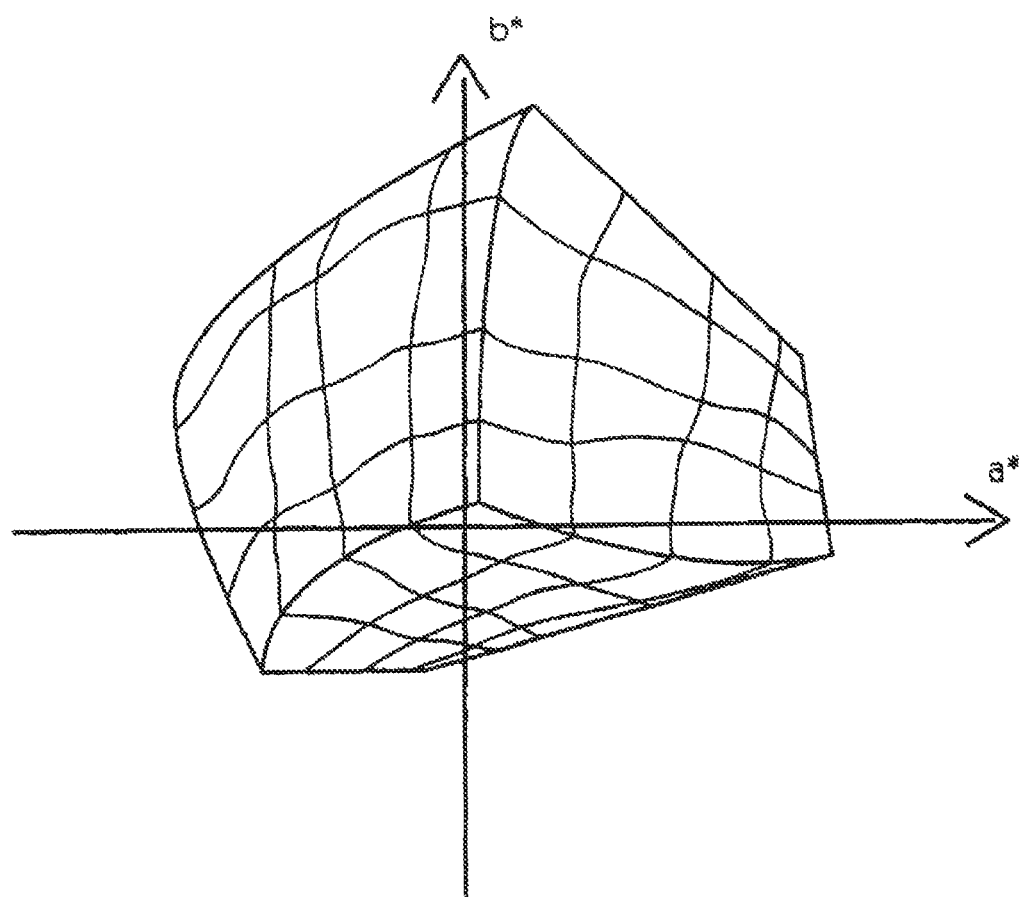
FIG. 4a represents the grid of an outer surface before performing the step 4.
Figure 4B:
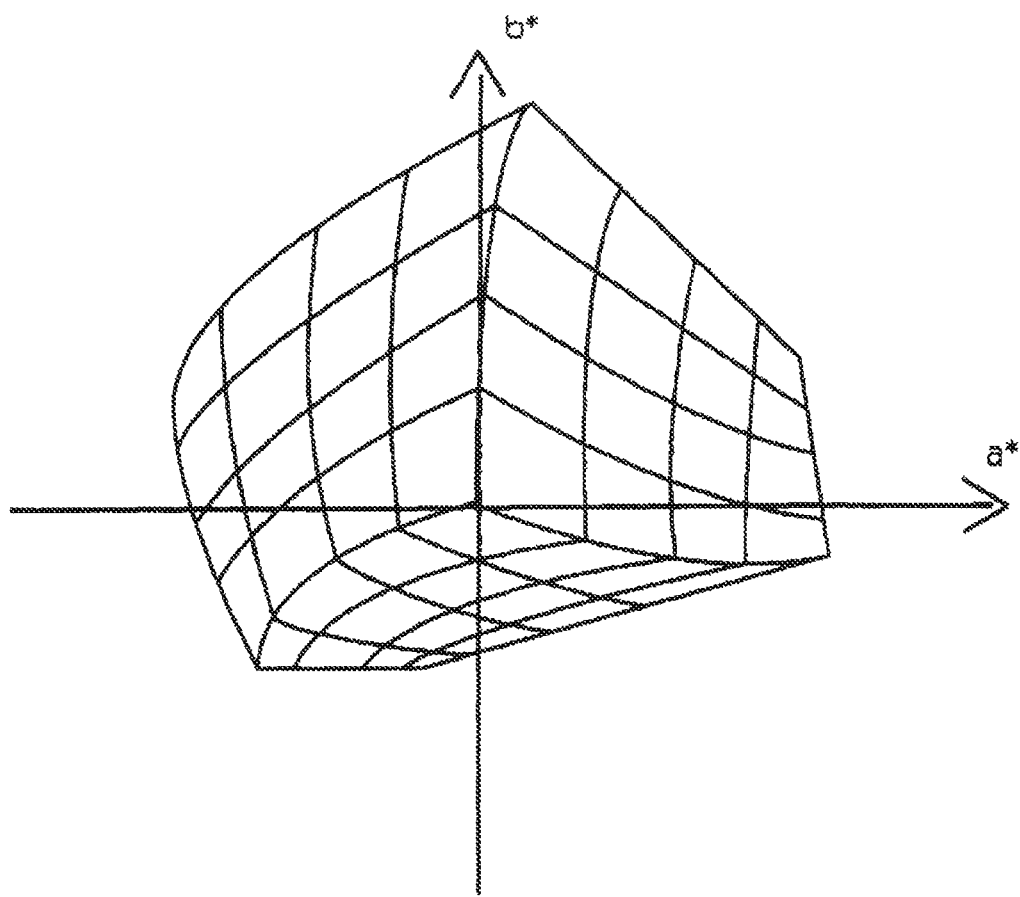
FIG. 4b represents the result of optimization according to step 4.

In the following the individual steps are described:
1. Colorimetric Limitation of the Maximal Value of the Primary Colors It is presupposed that for the control of a printer as usual control values (so-called tonal values from 0 to 100%) for each primary color are converted into applied color quantities. The color quantity that corresponds to 100% is in general predetermined such that it can be expediently processed with respect to print technology, for example, can still dry. However, this maximum value must not be meaningful with respect to colorimetrics. In this step, the colorimetrically optimal maximum value is determined.

With the printer, a test chart is printed that contains finally gradated ascending color fields for each primary color between 0% and 100% (for example, at a gradation of 1%). For each individual primary color the following is carried out: The measured CIE L*a*b* color values of the fields are entered in a one-dimensional table such that each percental gradation (each tonal value) is associated with a CIE L*a*b* value. The sequence of the CIE L*a*b* values is smoothed with a suitable method in order to eliminate printing or measuring imprecisions. The color saturation is determined for each step. For this purpose, chrome C* is suitable as a measure, for example; it is defined by $C_{ab}^* = \sqrt{(a^*)^2 + (b^*)^2}$. The optimum value of a primary color is at a point shortly before the saturation maximum at which the slope drops below a defined limit value upon reaching saturation. (Generally, different maximum values will result for different primary colors in this way.) All color fields above the optimal maximum value are removed from the table. The tonal values in the table are scaled linearly so that the optimal maximum value is assigned the new calorimetrically limited tonal value of 100%.

Drawing 1a shows the course of saturation of a primary color and the determination of the optimal maximum value based on the maximum of saturation. The saturation is plotted across the percental tonal value in the x-direction. The point x1 represents the optimal maximum value.

In the drawing 1b, the determination of the optimal maximum value is illustrated that is based on the drop of the increase of saturation below a defined value. This point is reached at x2. The limit value of the slope is indicated as a tangent.

Drawing 1c shows removal of the values above the optimal maximum value and linear scaling of the tonal values.

2. Colorimetric Linearization of the Primary Colors

In step 1, for each primary color the optimal maximum value was determined and the tonal values newly scaled. Within the three-dimensional CIE L*a*b* color space these gradations of a primary color typically form a curved graph beginning at paper white (tonal value of 0%) up to the optimal maximum value (tonal value 100%) where however the L*a*b* color spacings do not behave linearly relative to the tonal values. For linearization the length of the graph from paper white up to each step is determined and subsequently a new correlation is produced in which a tonal value now linearly corresponds to the proportion of the traveled length on the graph relative to the total length up to the optimal maximum value.

First, across the length of the graph the color spacing between the individual gradations is determined and added up. A suitable measure for this purpose is, for example, the equation $\Delta E$ (1976) that measures the Cartesian spacing in the CIE L*a*b* color space. With other color spacing equations, a visual difference evaluation that differs from the afore described one can be realized that then must no longer correspond to the length of the L*a*b* graph but is not detrimental with respect to the principle. In general, in the following reference is being had to cumulative color spacing.

In this way, a tabulated function results that assigns to the colorimetrically limited toner values of step 1 a cumulated color spacing with respect to paper white (in percent, relative to the maximum). This function is inverted so that it assigns to a relative spacing value the required tonal value. This is realized by interpolation. In this way, a new one-dimensional linearization table for this primary color is filled at the output side and contains a tonal value of step 1 for each relative spacing value (e.g. in 1% gradation) at the input side. The relative spacing values are the new control values and are now referred to as linear tonal values.

Suppose, for example, that in step 1 it has been determined that the colorimetric optimal maximum value of a printer-technological control is 80% and in step 2 that a colorimetric limited tonal value of 60% leads to a relative cumulated color spacing of 50% (half the travel length to the maximum value). The transformation of the control values will now convert by means of the linearization table a desired linearized tonal value of 50% to a colorimetric limited tonal value of 60% and scale the latter to the printer-technological control value of 48% (=80% of 60).

Drawing 2a shows the curved graph of a primary color in the CIE L*a*b* color space.

Drawing 2b shows the course of cumulated color spacing relative to the tonal values.

Drawing 2c shows the inverted function that assigns the tonal values to the cumulated color spacing. The point a1 corresponds to half the total cumulated color spacing. For this point the required tonal value can be read out on the y-axis.

Drawing 2d shows the linearization table for a primary color.

Subsequently, the total color gamut of the printer can be determined that is based on these colorimetrically limited and linearized primary colors. This can be done by using a suitable print-over model or by color measurement of a test chart that scans the entire color gamut by means of a suitable distribution of color fields. The linearization tables of the primary colors and the colorimetric imitation are taken into account upon printing the test chart in that the color proportion of the individual fields are corrected in accordance with the tables. This provides a correlation of control values to CIE L*a*b* color values. In this context, it is still accepted that the maximum color quantity (see below) is exceeded to a certain extent. The correlation is saved as a description of the printer behavior that is to be expected for the predetermined control values.

3. Colorimetric Determination of the Maximum Value of Combined Printing of All Colors For most printing systems there is in connection with a defined medium a maximum color application quantity. When more color is applied, for example, in case of an inkjet printer, color pools form on the medium or, in case of a toner-based printing system, the toner layer may tear and peel off. As mentioned in the beginning, the individual colors are limited already to print-technologically expedient color quantities. In combined printing, however, too much color can be applied easily. For colorimetric determination of the maximum quantity, on the basis of the printer description (correlation of step 2) in the CIE L*a*b* color space, an axis from paper white in the direction of increasing color application is determined, for example, for an idealized three-dimensional case, the neutral axis with a*=b*=0, for the general case, for example, the main diagonal of the hypercube from paper white to the oppositely positioned point with maximum color sum. Then, the endpoint of the axis within the measured color gamut is determined. In case of the neutral axis, this is the darkest neutral point (with minimal L*). The correlated printer control values then have the highest color quantity. Starting from this point, along the axis a special test chart is generated in which gradations that are becoming lighter are selected at fixed colorimetric spacings (e.g. 1 ΔL on the neutral axis) and the corresponding control values for color fields are determined from the correlation and used. This chart that is generated based on colorimetrics is printed and subsequently visually evaluated. In this connection, in descending direction the field is searched from which point on no visual defects are visible anymore. In this way, the maximum color quantity is determined that is however represented by a reduction of the maximum control values that is defined in CIE L*a*b*.

The description of the color gamut based on scanning is now scaled beginning at the end point of the axis depending on the control values in such a way that on the corners of the hypercube for all color combinations with higher color quantity the CIE L*a*b* color values are reduced accordingly. By multi-linear interpolation of the reduction between hypercube corners the CIE L*a*b* color values are reduced in the correlation and provide thus modified nominal values for the later multi-dimensional calibration. Based on this color gamut scaled in this way, the next step is calculated.

Drawing 3a shows a section of the CIE L*a*b* color space and the darkest point on the neutral axis m1. The points m2, m3, and m4 are lighter in each case by a defined amount ΔL*.

Drawing 3b shows schematically the test chart to be printed. The color composition of the individual fields corresponds to the neutral points found in 3a.

Drawing 3c shows the color space that has been scaled based on the maximum value m3. From the cube corners of the idealized three-dimensional case illustrated here, only the lower corner is reduced with the 300% sum of the control values but not the neighboring corners with 200%. Therefore, the multi-linear interpolation of the reduction substantially leads to a brightening of the CIE L*a*b* nominal values in the lower area without gamut loss in the saturated colors.

4. Determination of Equal-Spaced Outer Envelope of the Color Gamut

In order to obtain a color gamut that is visually as equally spaced as possible after calibration and color quantity limitation, in the next step the nominal values (in the CIE L*a*b* color space) for the outer envelope of the color gamut are defined. This means that for the case of an idealized three-dimensional calibration table all six outer surfaces of the CMY cube are considered. Such an outer surface forms a curved surface within the CIE L*a*b* color space. In case of a four-dimensional calibration table all 24 partial surfaces are considered; generally, all two-dimensional subspaces of the n-dimensional hypercube are treated in this way.

On each surface, a line grid is known from the correlation reduced in accordance with step 3 and its crossing points form the CIE L*a*b* color values. Despite the linearization of the individual colors, the crossing points are not necessarily uniformly distributed. The line grid follows the shape of the curved surface in the CIE L*a*b* color space. Each crossing point on the grid has a tonal value that is comprised of 2 color gradations of the primary colors and, depending on the position of the surface, 0% or 100% of the third and further primary colors.

The optimal outer surface is defined in analogy to step 2 based on the color spacing of two neighboring grid points, i.e., for all grid lines of the two-dimensional outer surface a linearization is performed as defined in step 2. First, on a line with constant primary color 2 the gradations in the direction of the primary color 1 in relation to the cumulated color spacing is linearized so that the L*a*b* nominal values on the line are moved. Then, on a line with constant primary color 1, the gradations in the direction of primary color 2 are linearized. Since in this connection displacements along the two crossing grid lines may occur for each point, it is advantageous to perform the linearization iteratively until only those displacements result that are below a defined limit value and in this way the optimum is achieved. As a result, the displaced tonal values of the crossing points correspond to the proportional cumulated color spacings in both grid directions.

On the original crossing points of the correlation grid of all outer surfaces, the CIE L*a*b* nominal values for the calibration table are now read out. After this step, the nominal values for the outer envelope are determined.

Drawing 4a represents the grid of an outer surface before performing the step 4. Drawing 4b represents the result of optimization according to step 4.

5. Interpolation of all Intermediate Values of the Calibration Table

In the next step, all further (the inner) CIE L*a*b* nominal values of the calibration table are calculated. A possibility for this is continuing the method of step 4 in that all three-dimensional subspaces of the reduced correlation table are linearized in relation to the cumulative color spacings, then all four-dimensional etc. For the idealized three-dimensional case, however, the gray axis is of particular importance and serves also as an additional inner anchor for a suitable interpolation within the outer envelope of the color gamut.

The gray axis is defined here as the connecting line between paper white and darkest neutral point. The corresponding tonal values of the gray axis are distributed such that here also the proportionally cumulated color spacing along the connecting line corresponds to the tonal value of the gray axis. This means that, for example, the CIE L*a*b* nominal value for 50% cyan, 50% magenta, 50% yellow is located at the center point of this connecting line.

For the interpolation of the table interior, the linearized outer surfaces and the linearized gray axis serve as support locations that represent the control values as the nominal color values. As a suitable method for the interpolation in such a point cloud, the "thin plate spline" interpolation method can be employed here.

With this interpolation or the subspace linearization it is now possible to calculate in the correlation table for any tonal value combination the appropriate CIE L*a*b* nominal value for the calibration.

In summary, from the original printer description (correlation of step 2), the colorimetric CIE L*a*b* nominal values were reduced such that they correspond to a compatible color quantity in the printing action and these values were then moved by means of the outer surfaces and inner interpolation such that the control values in this table lead to approximate equal-spaced homogenous behavior within the CIE L*a*b* color space.

However, it is not yet known which control values actually must be printed in order to arrive at this idealized behavior. By means of the original printer description, it is now possible to search for the combinations of control values that lead to a desired nominal value. In the case of several solutions (in the four-dimensional and higher dimensional case), the usually employed separation rules are utilized in order to select the best solution. This is saved also as output tonal value combination in the table.

6. Saving and Applying the Calibration Table

In order to be able to use the calibration table or to perform at a later time a new calibration in regard to the nominal values, the required intermediate results of the individual steps are saved. These are per primary color the one-dimensional linearization tables of step 2, that contain the colorimetric limit of step 1 implicitly, as well as the three-, four- or higher dimensional correlation table of control values to optimized CIE L*a*b* nominal values, and the required output tonal value combinations of step 5 saved.

When the calibration table is now utilized in order to prepare any data for the printer, it is possible, based on the saved values, to interpolate quickly for any input tonal value combination the output tonal value combination to be used without this requiring again that the more complex search for the suitable combinations that fulfill the nominal value be performed.

When a test chart (which contains fields with the input tonal value combinations of the table) that matches the calibration table is utilized and is output based on this data processing, the output tonal value combinations of the table are utilized and converted with the one-dimensional linearization table and printed. In the ideal situation, precisely the CIE L*a*b* color values are generated that are to be expected based on the printer description, i.e., the nominal values of the calibration table.

Over the course of time, by a change of the outer influences such as temperature, humidity etc., by a batch change of the employed printing ink or by a change of other factors, the color appearance of the print may change despite the same control being used. Then the test chart is printed differently with respect to color. When the printer is then to be calibrated to the original saved and optimized state, the deviations between nominal and actual values of calibration table are determined by measurement and, in the printer description, changes of the output tonal value combinations are searched for that, relative to the original output tonal value combinations, would compensate the corresponding color change. The thus corrected calibration table is saved and replaces the preceding version.

ADVANTAGES OF THE INVENTION

The methods according to the invention have the advantage that the nominal values of the calibration table are calculated in all combinations of combined printing. In this calculation, the nominal values are optimized, for example, with respect to an ideal gray balance and equal spacing of the primary color axes, the two-dimensional outer surfaces and continued in the entire interior of the color gamut.

A system calibrated in this way reacts everywhere in the color gamut similarly to changes of the input color values and represents therefore outwardly a color gamut that is particularly suitable for high standards with respect to color reproduction. This shows, for example, in very smooth and harmonic color transitions in any directions.

The described method is moreover relatively insensitive with respect to measuring imprecisions because the nominal values of the calibration table are calculated mathematically and are therefore smooth and benign.

What is claimed is:

1. A method for generating an optimized printer calibration by using a printer, the method comprising:
   a) printing with the printer a first test chart containing finely graduated ascending color fields for each primary color between 0% and 100%;
   b) limiting, with a processor, colorimetrically for each primary color a maximum value,
   c) linearizing, with the processor, each primary color colorimetrically,
   d) printing with the printer a second test chart and determining a maximum value of a combined printing of all primary colors colorimetrically,
   e) defining, with the processor, a resulting color gamut,
   f) determining, with the processor, an outer envelope of the color gamut with equal spacings;
   g) interpolating, with the processor, intermediate values of a resulting calibration table;
   wherein the step c) comprises:
      linearly scaling tonal values of a primary color so that the maximum value of the step b) corresponds to a tonal value 100%;
      determining a total length of a graph of each primary color in the CIELAB color space from a tonal value of 0% to the tonal value of 100% at the maximum value determined in the step b); and
      subsequently newly correlating the tonal values linearly to a proportion of a traveled length on the graph relative to a total length of the graph, beginning at 0% up to the maximum value that has been determined in the step b) and that corresponds to the tonal value of 100%.

2. The method according to claim 1, wherein the method step b) comprises determining a color saturation for each tonal value.

3. The method according to claim 2, wherein the maximum value is determined as a function of a maximum of the color saturation.

4. The method according to claim 1, wherein the method step c) comprises putting a spacing of a tonal value to paper white in relation to a spacing of the maximum value to paper white.

5. The method according to claim 1, comprising generating the second test chart in the step d) based on fixed colorimetric spacings.

6. The method according to claim 1, wherein the method step c) comprises linearizing first along a line of a first constant primary color a gradation in a direction of a second primary color and then, along a line of the second constant primary color, linearizing a gradation in a direction of the first primary color.

7. The method according to claim 6, wherein linearizing is performed by putting a spacing of a tonal value to paper white in relation to a spacing of the maximum value to paper white.

8. The method according to claim 7, being performed iteratively.

9. The method according to claim 6, being performed iteratively.

10. The method according to claim 1, wherein the method step g) comprises performing an interpolation on the basis of a linearized gray axis.

11. The method according to claim 10, comprising defining nominal values of the gray axis for determined tonal values in L*a*b*.

12. The method according to claim 11, comprising factoring in the outer envelope linearized in the step e) and the defined nominal values of the gray axis for the interpolation of the nominal values of the printer calibration.

13. The method according to claim 11, comprising calculating output tonal value combinations based on the L*a*b* nominal values and adjusting the calculated output tonal value combinations iteratively in order to obtain the nominal values.

14. The method according to claim 1, wherein the step f) comprises two-dimensionally linearizing the outer envelope of the color gamut.

\* \* \* \* \*